Figure 1:
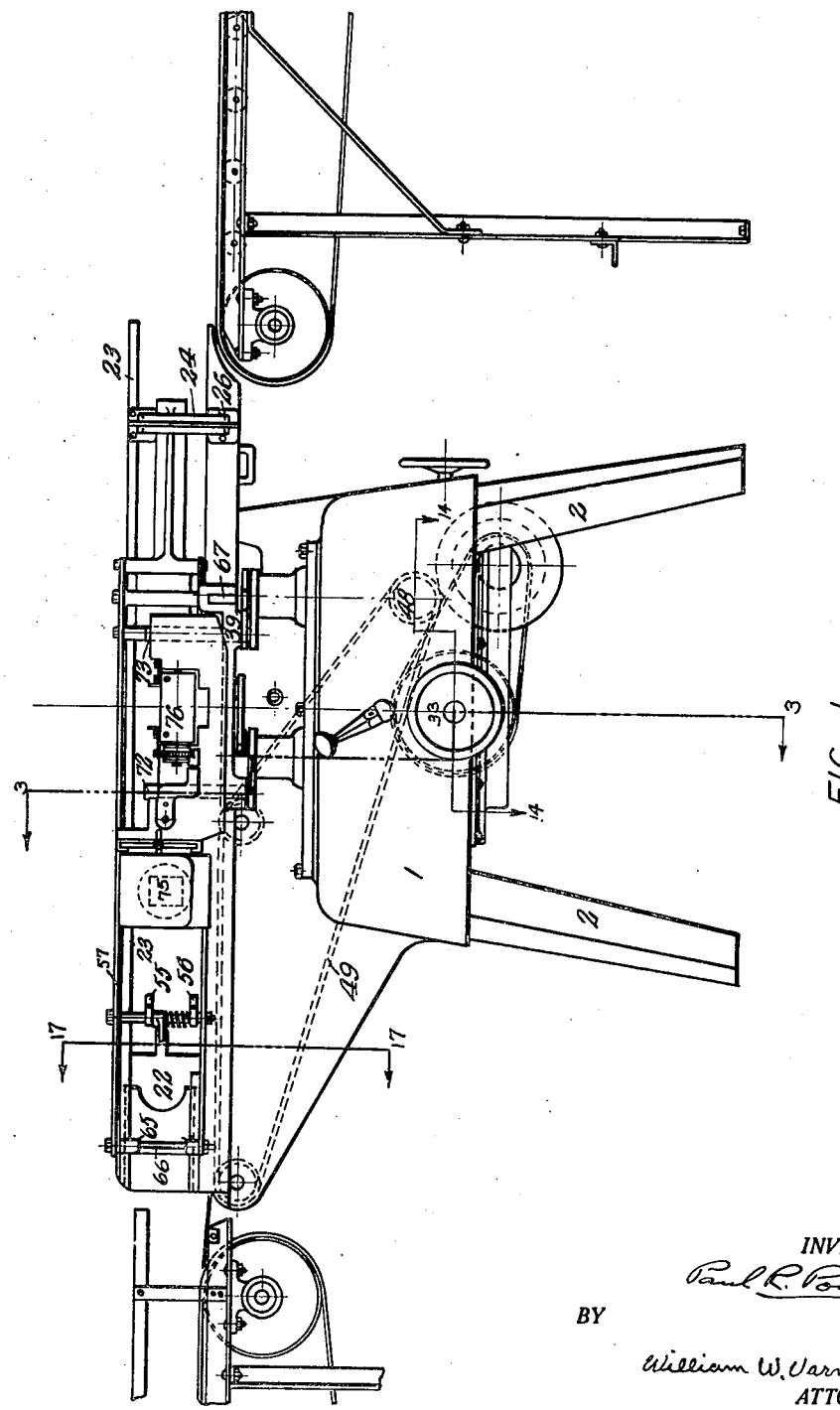

Aug. 10, 1937. P. R. POWELL 2,089,422
LABELING MACHINE
Filed Nov. 14, 1934 8 Sheets-Sheet 1

INVENTOR.
Paul R. Powell
BY
William W. Varney
ATTORNEY.

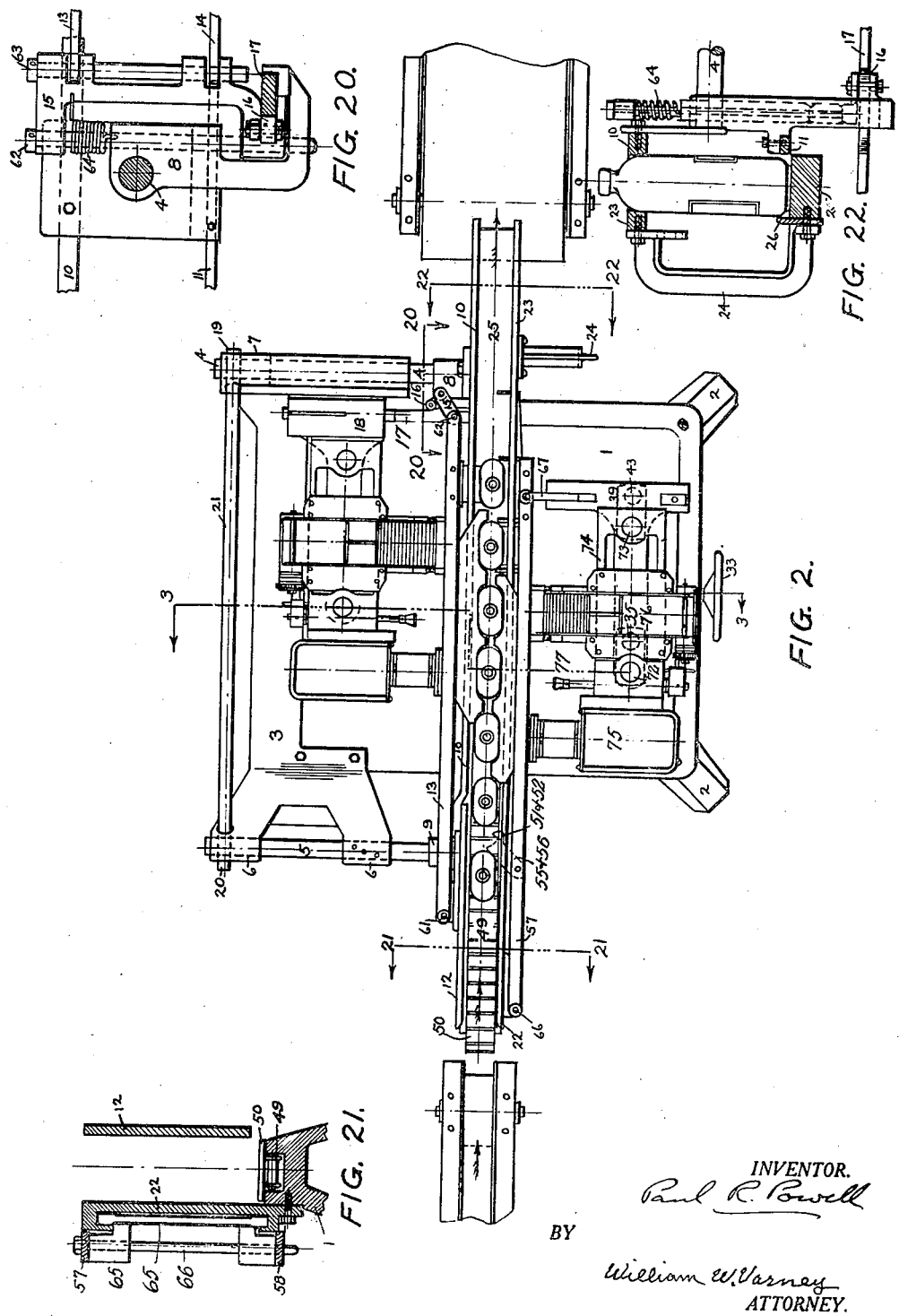

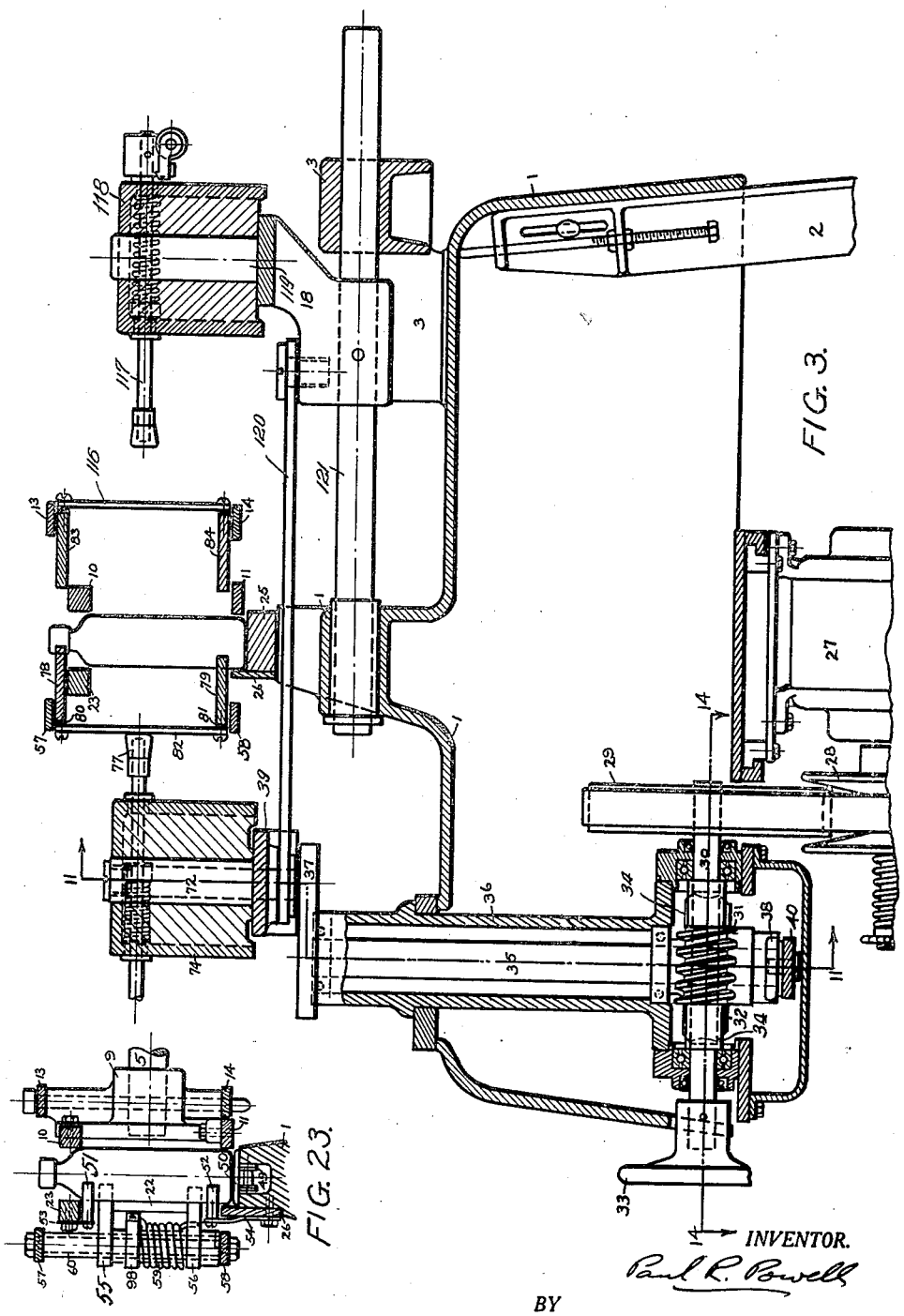

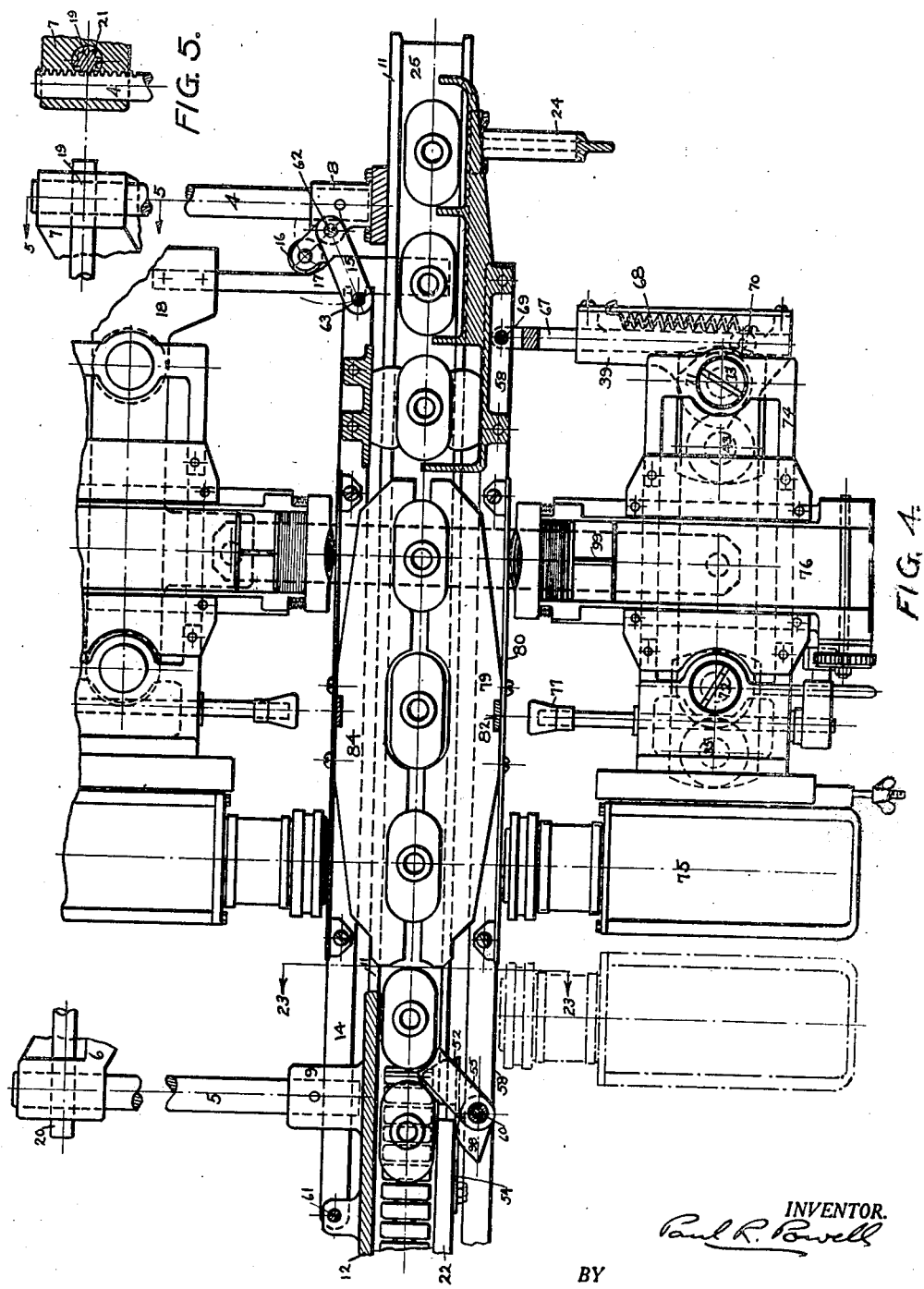

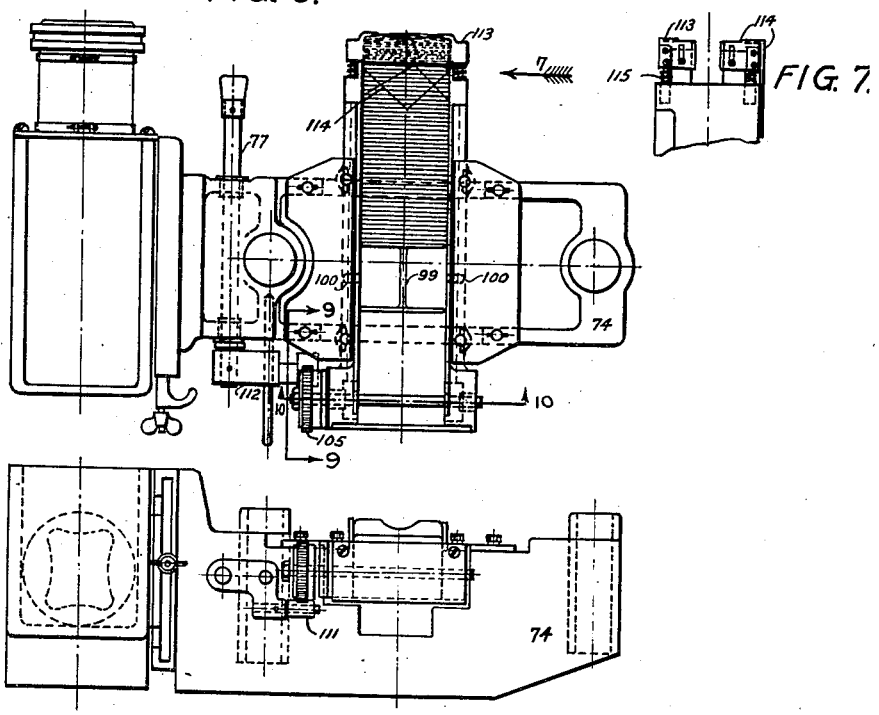
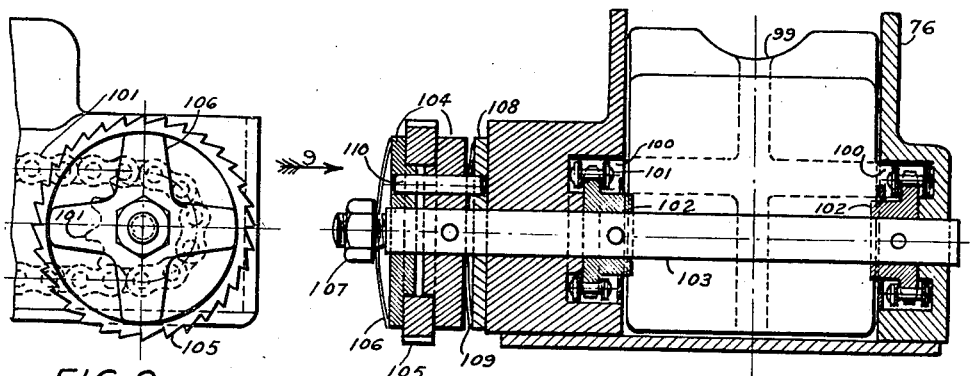

Aug. 10, 1937.　　　P. R. POWELL　　　2,089,422
LABELING MACHINE
Filed Nov. 14, 1934　　　8 Sheets-Sheet 6
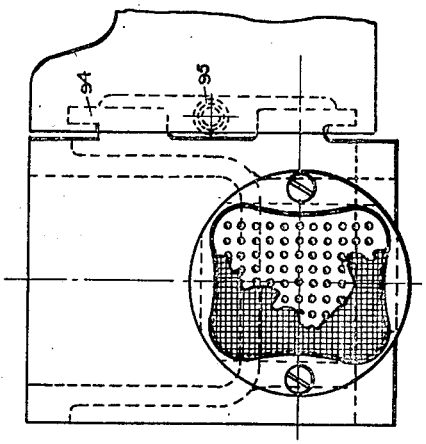
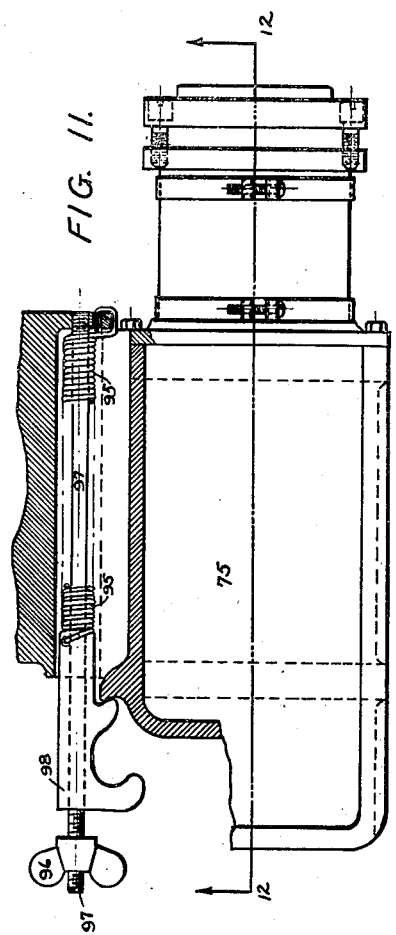
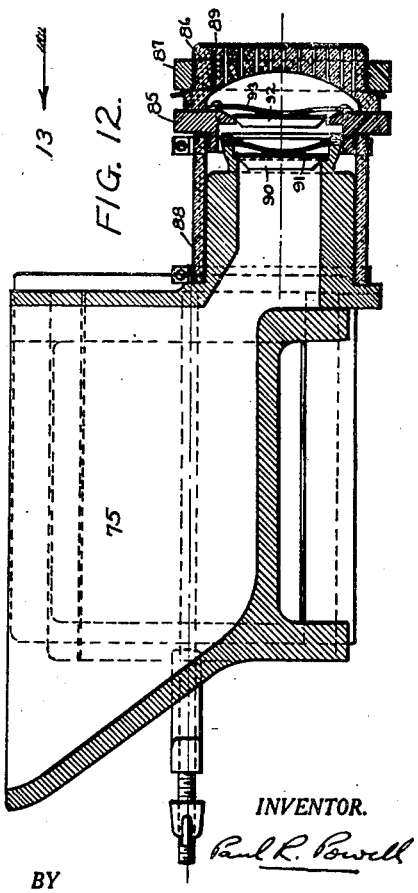
INVENTOR.
Paul R. Powell
BY
William W. Varney
ATTORNEY.

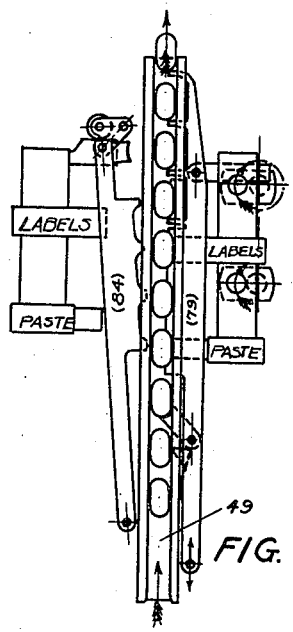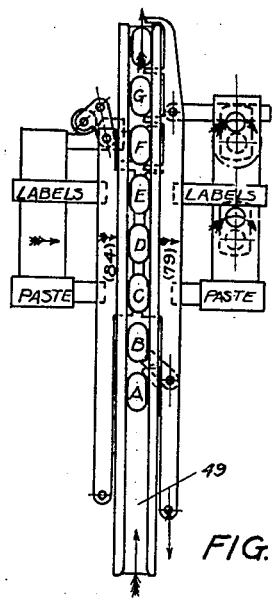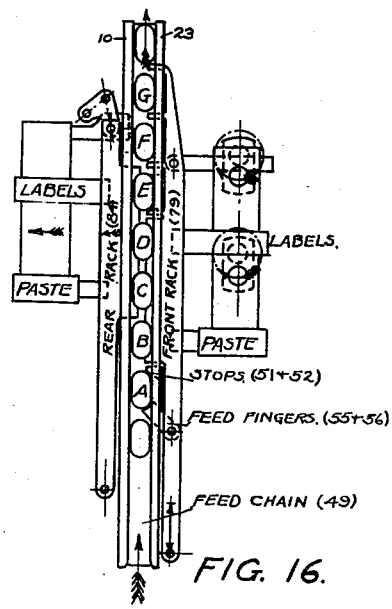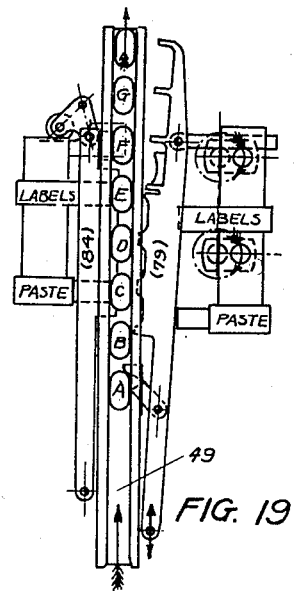

Patented Aug. 10, 1937

2,089,422

UNITED STATES PATENT OFFICE 2,089,422

LABELING MACHINE

Paul R. Powell, Baltimore, Md.

Application November 14, 1934, Serial No. 753,054

12 Claims. (Cl. 216—36)

The object of my invention is to provide improved means for attaching labels to containers, particularly bottles.

A further object of my invention is an improved means for conveying containers or bottles of irregular shape through a labeling machine, maintaining the desired position of the same at various predetermined points while within said machine.

A further object of my invention is the providing in a labeling machine conveying racks for containers being labeled, said racks acting as locating racks while the container is being operated upon.

A further object of my invention is the providing means in a labeling machine for operating on containers, pasting, labeling, pressing, etc., while the container is in motion.

A further object of my invention is the providing in a labeling machine improved means for applying adhesive to the container to which a label is to be attached.

A further object of my invention is improved means for applying the label to a container in a labeling machine from a supply of labels.

A further object of my invention is the construction of a labeling machine of simple design and operation, positive in action and durable in service, and of an improved character over existing machines performing like service.

A further object of my invention is the providing in a labeling machine, improved conveyor racks readily removable and replaceable to adapt the machine to various shaped containers.

A further object of my invention is the providing in a labeling machine, label magazines and paste-applying devices readily removable in one unit for each label, such unit being readily replaced by other units to apply other sized labels, thus eliminating all intricate adjustments.

A further object of my invention is an improved means for conveying containers through a labeling machine while being labeled.

A further object of my invention is an improved method of conveying containers through a labeling machine while being labeled.

With the foregoing and other objects in view, my invention consists of the methods employed, combination and arrangement of systems, apparatus and means as hereinafter specifically set forth claimed or illustrated in the accompanying drawings, wherein is shown the preferred embodiment of my invention; but it is understood that changes, variations and modification may be resorted to which come within the scope of the claims hereunto appended.

Figure 14:
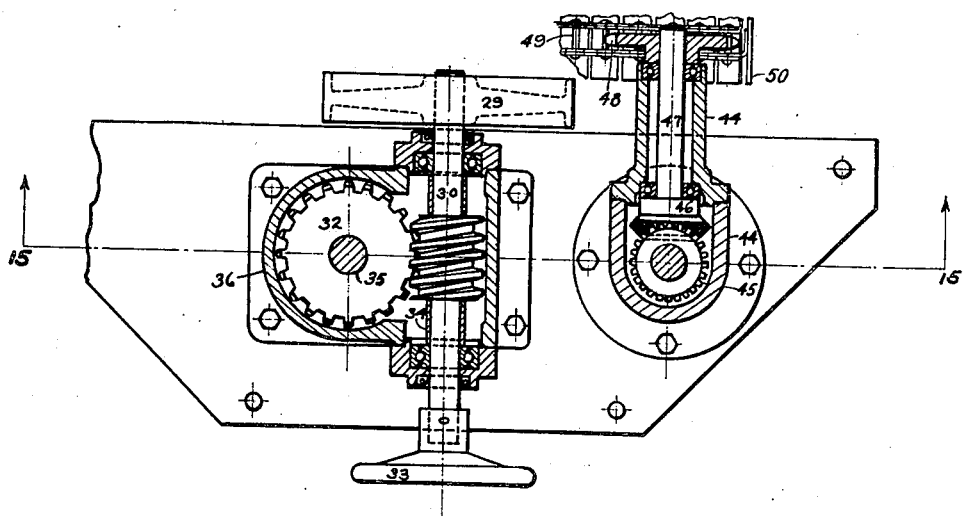
Figure 15:
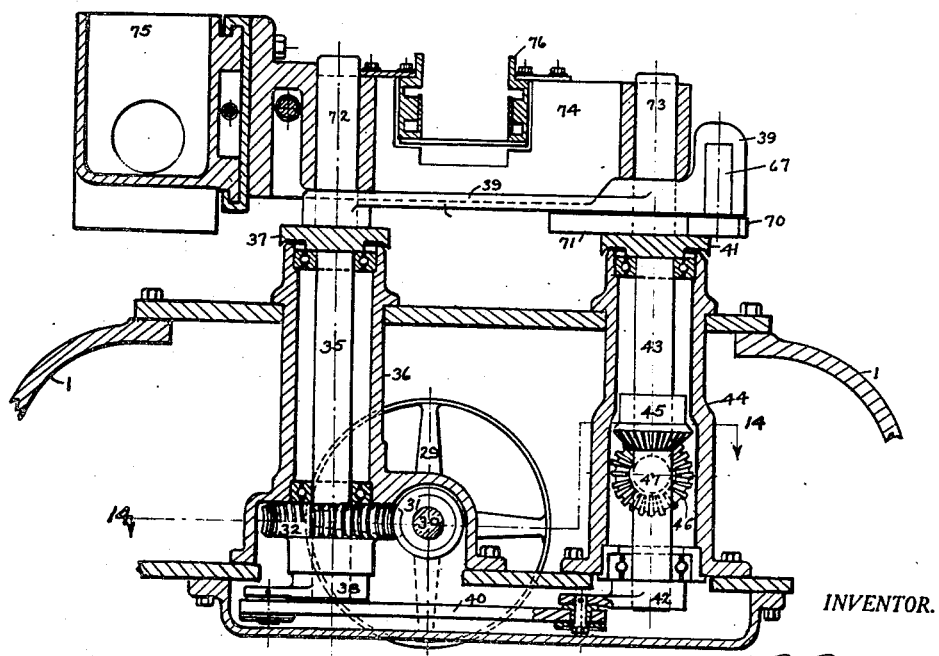

In the drawings of the herein-described embodiment of the machine for carrying out my invention and process, Figure 1 is a side view in elevation of my improved labeling machine; Fig. 2 is a plan view of my improved labeling machine, the machine shown in Fig. 1; Fig. 3 is an enlarged sectional view of the machine, taken through 3—3 of Figs. 1 and 2, looking in the direction of the arrows, the shafts 35 and 43 having been turned 90°; Fig. 4 is an enlarged plan view of a portion of the machine shown in the plan view of Fig. 2, partly in section, the shafts 35 and 43 having been turned 180°; Fig. 5 is a sectional view of that portion of the machine shown in Fig. 4, taken through 5—5 of Fig. 4, looking in the direction of the arrows; Fig. 6 is an enlarged plan view, showing particularly the labeling device, including the label magazine and adhesive container; Fig. 7 is a view in side elevation of that portion of the machine shown in Fig. 6, shown by the arrow 7, and looking in the direction of said arrow, and showing particularly the retaining mechanism for the labels in the labeling device; Fig. 8 is a view in elevation of the parts of the machine shown in Fig. 6; Fig. 9 is a view in elevation of that portion of the machine shown in Figs. 6 and 10, looking in the direction of the arrows 9—9; Fig. 10 is a vertical sectional view, taken through 10—10 of Fig. 6; Fig. 11 is a plan view of the adhesive reservoir and adhesive-applying device, partly in section; Fig. 12 is a sectional view of the device as shown in Fig. 11, taken in elevation through 12—12, of Fig. 11, looking in the direction of the arrows; Fig. 13 is a view in elevation of the contacting device of the adhesive-applying means shown in Fig. 12, looking in the direction of the arrow 13; Fig. 14 is a sectional plan view of the drive of the machine, taken through 14—14, of Figs. 1, 3 and 15; Fig. 15 is a sectional elevation of the drive of the machine, taken through 15—15 of Fig. 14; Figs. 16, 17, 18 and 19 are diagrammatic outlines of the operation of the machine; Fig. 20 is a sectional view showing the mechanism for operating the rear positioning racks, taken through 20—20, of Fig. 2, looking in the direction of the arrows; Fig. 21 is a sectional view, particularly showing the feed chain, taken through 21—21 of Fig. 2, looking in the direction of the arrows; Fig. 22 is a sectional view, showing particularly the construction of the delivery end of the machine, taken through 22—22, of Fig. 2, looking in the direction of the arrows; Fig. 23 is a sectional view, taken through 23—23 of Fig. 4, looking in the direction of the arrows.

Before describing my invention in detail, I will explain the manner of the passage of a container through the machine, and the operations performed upon the same (see Figs. 16-19).

If it be desired to attach a label to a bottle or container of any regular, or irregular, shape the same is placed on the feed chain 49 in the relative position desired for the passage of the same through the machine. The container is carried by said chain into the machine and against yielding stops 51 and 52 which are sufficient to arrest the movement of the container against the carrying tendency of the chain upon which it rests, but will yield when the container is positively forced by the feed-fingers 55 and 56, said stops holding it in position "A" until gripped by the feed-fingers, said fingers carrying it past (see Fig. 17) the yielding stops into a position "B" (see Fig. 16) to be gripped by the front positioning rack and against the back guide rail 10. The front positioning rack is shaped to fit the container being labeled, and may be changed to suit different shapes. In this position "B" (see Fig. 16), the container is gripped by the front positioning rack and carried forward one step to position "C", and while the container is being so carried forward adhesive is applied to the front side thereof (see Fig. 17).

When the container reaches the position of rest, at "C", (see Fig. 18), it is released by the front positioning rack 79 and gripped by the rear positioning rack 84 and held against the front guide-bar 23, said positioning rack being shaped to suit the particular shape of the container. In this position "C", and while stationary, adhesive is applied to the rear of the container (see Fig. 19), the front positioning rack receding to obtain a new container and to regrip the present container to carry it forward another step to position "D", during which the rear positioning rack recedes, permitting the front positioning rack to move the container to position "D", this latter position "D" being an intermediate position. The operations of the racks are repeated, and while the container is being moved from the position "D" to the new position "E" by means of the front positioning rack, a label is applied (see Fig. 17), when the container has stopped at position "E" and is embraced by the rear positioning rack, the label on the rear is applied (see Fig. 19).

At this position, we have labels on both the front and rear of the container. From position "E" the front positioning rack moves away from the container and back to receive another container, and the front presser which is attached to the front rack carrying mechanism is brought back into position and presses the front label at station "E" and during its conveyance to station "F", the rear positioning rack receding and with it the rear presser which is carried on the rear positioning rack-carrying means. Upon reaching the position "F", the front label of the container is pressed into position, and upon the inward movement of the rear positioning rack carrying the rear presser, is brought into contact with the rear label which is pressed on the container at station "F" (see Fig. 19). The front positioning rack recedes and travels backward to embrace another container, thereby carrying with it the front presser and a conveying means to move the container from station "F" to station "G", which is accomplished upon the movement of the said front positioning rack, bringing in a new container. The delivery of the machine is a receiving belt, or other means, not shown, the containers being shoved by the last mentioned conveying means onto the same.

Similar numerals refer to similar parts throughout the several views.

General construction 1 is the main frame, which is suitably formed to have the operating mechanism bolted to it. 2 are the legs, which are made adjustable to accommodate shop conditions (see Figs. 1-3). On top of frame 1 is secured carrying bracket 3 supporting rack (see Figs. 2 and 3) shafts 4 and 5 by means of sliding bearings 6 and 7; these shafts operate endwise for adjusting purposes to accommodate different receptacles operated upon (see Figs. 2-4).

Rack-shafts 4 and 5 carry on one end heads 8 and 9. On head 8 is secured upper rear guide-bar 10 and lower rear guide-bar 11 (see Figs. 2, 3 and 20); on head 9 is secured rear guide-plate 12, upper rear guide-bar 10 and lower rear guide-bar 11, also upper rear rack-bar 13 and lower rear rack-bar 14, which are pivotally mounted thereto (see Fig. 23).

On head 8 is journalled bell-crank 15 by means of double bearings, forming, as it were, two bell-cranks operated by one cam roller 16 (see Figs. 2, 4 and 20). On one end of bell-crank 15 is cam roller 16, operated by cam 17 which is secured by means of its elongation to the rear carriage 18; said bell-crank being mounted on head 8 by means of pin 62 and being provided with spring 64 which tends to keep the bell-crank in such position as to hold the racks in a gripping position against the action of cam 17.

Rack shafts 4 and 5 are adjusted by means of pinions 19 and 20 secured to shaft 21 at each end thereof, respectively (see Fig. 5). Shaft 21 is turned by means of a wrench, or otherwise, thereby turning said pinions which are formed thereon to adjust rack shafts 4 and 5, as may be desired, and which are locked in position by pins in bearing 6.

22 is a guide plate secured to frame 1 (see Figs. 2 and 21). 23 is the front top guide bar secured at one end to plate 22 (see Fig. 2), and at the other end secured to bracket 24, which bracket is secured to slide-plate 25 (see Figs. 2 and 22). 26 is the front bottom guide-bar attached to slide-plate 25 (see Fig. 22). Slide-plate 25 extends from a position near the conveyer chain to the delivery point of the machine (see Figs. 2 and 22), and is secured to main frame 1.

Drive mechanism

Referring to Fig. 3, 27 is the motive power, as shown an electric motor, which drives variable speed pulley 28, which pulley drives driven wheel 29 which is attached to shaft 30. On shaft 30 is worm 31 (see Figs. 3, 14 and 15), which worm drives worm-wheel 32. On shaft 30 is hand-wheel 33 for turning the machine over by hand. Shaft 30 is mounted in preferably ball-bearings with grease-retaining appliances; the thrust of the shaft is taken care of by means of spacing sleeves 34.

Worm-wheel 32 is secured to upright shaft 35, which shaft is journalled in worm-box 36 preferably by means of ball-bearings, and has at each end thereof cranks 37 and 38, said cranks being set at 90° with reference to each other in order to avoid dead centers. Said cranks, by means of connecting rods 39 and 40, drive cranks 41 and 42 secured on upright shaft 43 mounted in gear-box 44, preferably by means of ball-bearings, as shown. Connecting-rod 39 forms a table or support for the pasting and label appliances.

On shaft 43 is mounted mitre gear 45, driving gear 46, which mitre gear 46 drives shaft 47, said shaft being journalled in gear box 44, preferably by means of ball-bearings.

On the outer end of shaft 47 is mounted sprocket-wheel 48 which drives the feed chain 49 (see Figs. 1 and 2), said feed chain 49 having plates, or carriers, 50 secured thereto.

Chain belt 49, with its conveyer elements, carries the containers up to position A, in diagram 16.

51 and 52 (see Fig. 23) are yieldable stops mounted on the upper and lower front guide bars, 23 and 26, respectively and are provided with retaining means, springs 53 and 54, respectively.

55 and 56 are feed fingers pivotally secured by means of shaft 60 to upper and lower front rack-bars 57 and 58 (see Figs. 4 and 23). Shaft 60, upon which these fingers are secured, is provided with a spring 59 tending to keep said fingers in a gripping position whereby said fingers are free to disengage and slide out of the way upon the receding of the rack bar on the back stroke when the container is in position.

Referring to Fig. 23, which shows particularly the feed fingers 55 and 56 which are secured on shaft 60 and carried thereby, spring 59 at one end is secured to one of the fingers, as shown in Fig. 23, which tends to keep the fingers in operative position; the other end of the spring is carried by cam 98, which cam is mounted rotatively on shaft 60 which is operated by guide plate 22 (see Fig. 4). The object of this cam is to increase the pressure on the spring when it strikes guide plate 22 to insure the feed finger contacting with the container which it is to push, and on the return stroke, cam 98 being free from guide plate 22, eases the pressure on the spring to assure the feed finger being free to recede past a container on the feed apron without pushing back the same.

Rear rack-bars 13 and 14 (see Fig. 20) are mounted by means of pins 62 and 61 (see Fig. 2) to guide plate 12 at one end, and to bell-crank 15, at the other; bell-crank 15 swings out in the operation of cam 17.

Front rack bars 57 and 58 are pivotally mounted at one end to the slide 65 by means of pin 66 (see Fig. 21), which slide 65 reciprocates with the lateral action of rack bars 57 and 58, in guide plate 22 and which are mounted at the other end to slide 67 (see Figs. 2 and 4), which operates in and out with the motion of the front table or connecting rod 39, and is held inwardly by spring 68, shown in Fig. 4. On slide 67 is mounted cam roller 70, operating against cam 71 (see Figs. 4 and 15).

The operation of rack-bars 57 and 58, when contacting with the containers and while operating in contact therewith, is rather a delicate operation, especially when thin containers with much decoration thereon are involved. To modify and control this action is the object of cam 71 mounted on crank pin 73, which cam operates roller 70. Roller 70 is attached to the end of slide 67 and bears against the cam, this giving a limit of motion outward of slide 67, slide 67 being maintained outward and in this contacting position by spring 68; but it may recede inward against the tension of this spring to any extent desired. The cam is so timed that at about the time of contact of the rack-bars rack with the container the cam has eased slide 67 and allowed it to come into action gradually, thus permitting said rack-bars to gradually and easily contact with the container. It might be well to mention that pin 69 travels on the straight side of a substantially semi-circular closed path while the rack-bar is in contact with the container.

*Operation of front table—(On connecting-rod 39)*

On cranks 37 and 41 (Figs. 2 and 15) are secured crank pins 72 and 73, passing through connecting-rod 39 and giving to the same and the table 74 thereon a circular motion, maintaining the axis of said connecting-rod at the same angle to the axis of feed of the machine at all times, whereby parts located on the attached table forming a part thereof and positioned thereon normal to the axis of travel of the belt of the conveyers are maintained in such normal position during said circular motion.

*Label magazine and pasting unit*

On pins 72 and 73 may be slipped removable magazine carrier 74 on which are mounted adhesive-container 75 and label magazine 76, also pressure bar 77 which applies pressure to the front positioning racks 78 and 79.

This unit is removable to adapt the machine for different size labels by merely slipping off one unit and placing on another. A similar construction and unit is on the rear of the machine, being of substantially the same construction, but having right and left members.

*Pasting device*

On adhesive-container 75 is resiliently mounted nose-plate 85 to which is clamped rubber pad 86 by means of clamping ring 87, the joint between 75 and 85 being sealed by rubber ring 88. Over the surface of rubber pad 86 is stretched and held felt pad 89 by means of clamping ring 87. In the nose of 75 is valve 90 held in by spring 91, and in 85 is valve 92 and spring 93, of similar construction.

As felt pad 89 strikes the container it is forced back, compressing rubber pad 86 and pushing back nose-plate 85, thereby making a pump cylinder between the two valves 90 and 92, valve 90 closing and valve 92 opening, allowing passage of adhesive into holes through pad 86 and permeating felt pad 89, sufficient pressure being built up therein to give a good coating of paste on the container.

As the stroke continues after contacting with the container, container 75 slides back in ways 94 against the action of spring 95 until stopped by the adjustable nut 96 on screw 97. This increases the pressure against the container and causes nose-plate 85 to push back towards adhesive-container 75, thus compressing rubber ring 88 and producing increasing pressure in the adhesive inside the pad. By setting up adjusting nut 96 this pressure can be regulated and thereby the amount of paste fed to the container is controlled.

*Bottle holding mechanism*

Positioning racks 78 and 79 are resiliently mounted on rack-bars 57 and 58, respectively, (see Figs. 3 and 4), by means of springs 80 and 81, and are connected together by bar 82 in such manner that when bar 82 is pushed by pusher-bar 77 the pressure is equalized between 78 and 79, and also between each of the ends thereof. In this manner the containers held by each end of the positioning rack are firmly gripped, the container in the central position being loose owing to the racks being of larger size at said position to permit this looseness, as the container in the middle position is not operated on but simply transmitted along. Positioning racks 88 and 89 are attached to rack bars 13 and 14, respectively, in the same manner that positioning racks 78 and 79 are attached to rack bars 57 and 58 (see Figs. 3 and 4). They are connected together by the bar 116 in such manner that when bar 116 is pushed by pusher bar 117, the pressure is distributed between 88 and 84 and also between each of the ends thereof.

Pusher bar 117 is mounted in rear magazine carrier 118 which slips on and off pins 119 mounted in rear table 18 in the same way as the front magazine carrier 74 is mounted on the sleeves 72 in front table 39.

The rear magazine and pasting devices are exactly similar to the front ones.

Rear table 18 is actuated towards and from the containers by connecting rod 120 attached to the front table 39 and is mounted on slide bar 121 which slides in bearings in main frame 1 and bracket 3.

*Label magazine and means for feeding the same*

Label magazine 76 is secured to carrier 74, which carrier, as heretofore described, is mounted on pins 72 and 73 (see Figs. 4, 6 and 15). In label magazine 76 is pusher 99 which is operated by two sprocket chains secured to protruding lugs 100 on either side, shown in dot in Fig. 6, and is shown in full behind the sprocket-wheel in Fig. 10. 101 are sprocket chains operating over sprocket wheels 102 and driven thereby. The top end of sprocket chains 101 are secured to lugs 100, the other or bottom end of the sprocket chain slides loose in its housing. The sprocket chain operates in a closed housing and for driving the pusher shoves instead of pulls, as is common, but cannot buckle owing to its closed housing.

Sprocket wheels 102 are secured to shaft 103 and are driven thereby. Shaft 103 is driven by clutch 104, which clutch clamps and carries operating ratchet-wheel 105. This ratchet wheel is clamped by the clutch at any desired pressure by means of spring 106, the tension of which is regulated by screw and nut 107; thus by means of the screw 107 any desired friction may be placed on operating ratchet-wheel 105 which feeds the labels. To prevent undesired movement of shaft 103, collar 108 is provided; between said collar 108 and the clutch is spring 109 which may be of any desired pressure, this pressure forcing collar 108 against the housing, thus giving any desired frictional pressure. Pin 110 is provided to engage said collar with said clutch in order to secure shaft 103 to said collar in rotative movement.

Ratchet-wheel 105 is driven by pawl 111 on a rear extension 112 of pusher bar 77, the driving stroke of pusher 77 operating ratchet wheel 105 on its forward stroke after contacting with bar 82 in its resilient movement through its mountings.

Magazine 76 is in the form of an open box or trough, with the front end open, with the exception of the retaining clips 113 and 114 which are resiliently mounted on the sides of 74, being pushed outward by springs 115. Small flanges on retaining clips 113 and 114 engage portions of the labels, thereby preventing them from being forced out of the magazine by pusher 99. When these clips contact with a container for the purpose of labeling, retaining clips 113 and 114 move backward to compensate for the irregularities in the container, and also for the further purpose of releasing the label when they move forward again as the magazine is receding from the container, the pusher remaining stationary at this time, leaving the labels loose in the magazine.

In this specification and claims, I use the terms "adhesive", "paste" and "glue", synonymously; and "adhesive-applying", "pasting", or "gluing", synonymously

Having thus described my invention, what I claim and desire to secure by Letters Patent is:

1. In a labeling machine provided with containers feeding mechanism, means for applying to containers being fed adhesive first on one side and then on the other, then a label on the first side, a label on the second side and pressing pressure to the first side and then the other side of said container while passing through said labeling machine in a step by step movement.

2. In a labeling machine, means for conveying containers through said machine consisting of a conveying rack provided with a plurality of container holding means, means for advancing said conveying rack while embracing a container a step in the progress of said container, means for applying adhesive to said container while so advancing, means for releasing said conveying rack from said container and retracting the same to embrace the said container in a new position in said rack, means for advancing said conveying rack while embracing said container a further step in the advance of said container, means for applying a label to said container having had adhesive applied thereto while so advancing whereby said container may be advanced step by step through the machine and have paste applied thereto and a label applied thereto while being advanced.

3. In a labeling machine, means for conveying containers through said machine consisting of a conveying rack provided with an equalizing device whereby a plurality of containers are held at substantially a predetermined pressure, means for advancing said conveying rack while embracing the containers a step in the progress of said containers, means for applying adhesive to said containers while so advancing, means for releasing said conveying rack from said containers and retracting the same to embrace the said containers in a new position in said rack, means for advancing said conveying rack while embracing said containers a further step in the advance of said containers, means for applying labels to said containers having had adhesive applied thereto while so advancing whereby said containers may be advanced step by step through the machine and have paste applied thereto and labels applied thereto while being advanced.

4. In a labeling machine, means for advancing containers therein consisting of racks progressively advancing said containers in said machine, said racks being detachably secured to operating mechanism whereby racks of various designs to fit containers of various shapes are interchangeable on said operating mechanism in combination with a table for supporting adhesive-applying and label-applying means, positive driving means for operating said table consisting of members having means for imparting circular motion to the elements of said table and maintaining the angle between the axis of revolution of the table and the line of advancement of said container fixed, said motion adapted to bring the adhesive-applying and label-applying means into contact with containers in said machine and to maintain such contact during a portion of the advancing movement of said containers, and means for operating said positive driving means and said advancing means in timed relation.

5. In a labeling machine provided with means for conveying containers therethrough, a unit for supporting the pasting appliance and the labeling appliance, an operating mechanism for detachably mounting said unit embracing said appliances on said operating mechanism, whereby said unit is advanced to and from said containers at predetermined points of their position while in said machine.

6. In a labeling machine provided with means for advancing containers therethrough, a table for supporting adhesive-applying and label-applying means, positive driving means for operating said table consisting of members having means for imparting circular motion to the elements of said table and maintaining the axial angle of said table relatively fixed with reference to the line of advancement of said containers, said movement adapted to contact the adhesive-applying and label-applying means with containers in said machine and to maintain such contact during a portion of the advancing movement of said containers, and means for operating said positive driving means and said advancing means in timed relation.

7. In a labeling machine provided with conveying means for advancing containers therethrough, a support mounted to operate in a circular path in a plane substantially parallel with the plane of operation of said conveying means, said support having thereon a table for holding adhesive-applying and label-applying devices in applying relation to containers advanced by the conveying means, means to maintain said table relatively positioned with reference to the line of travel of said containers, and means to move said table with relation to the line of travel of said containers timed to present said devices in contact with said containers at predetermined positions of the travel of said support and maintain said contact through a definite arc of travel of said support.

8. In a labeling machine provided with means for advancing containers therethrough, means for supporting an adhesive-applying device and label-applying device as a single unit adjacent the line of advancement of the containers, means for moving said supporting means toward said line of advancement whereby to contact said devices with containers advancing through the machine, said moving means comprising positively operated members upon which said supporting means is mounted operable in a circular path whereby said supporting means presents said adhesive-applying and label-applying devices simultaneously to advancing containers and holds said devices in contact with said containers during a portion of the advancing movement thereof.

9. In a labeling machine provided with means for the advancement of containers therethrough, a label magazine operating to contact the container, said magazine being provided with a pusher for advancing labels therein, means for advancing said pusher comprising a positively operated member, which member operates by means of friction an intermediate mechanism, said mechanism consisting of a friction-clutch operated member provided with pressure regulating means for regulating the slipping pressure thereof with reference to said positively operated member, the said intermediate mechanism operating said pusher.

10. In a labeling machine provided with means for conveying containers therethrough, said means consisting of oppositely disposed gripping devices with reference to the container being conveyed, alternately gripping said containers and advancing the same, a pair of oppositely disposed pasting, labeling and pressing devices for labeling the opposite sides of the container being advanced, one of said pair operating to label the container while quiescent and the other of said pair operating to label the opposite side of the container while in motion, and means for mutually adjusting said two pairs to accommodate the relative positions of operation whereby different size containers may be operated upon, in combination with means for operating said two pairs in relative timed relation with reference to said gripping devices.

11. In a labeling machine provided with means for conveying containers therethrough, said means consisting of oppositely disposed gripping devices with reference to the container being conveyed, alternately gripping said containers and advancing the same, said gripping devices being detachably secured to an operating means whereby gripping means of various designs to fit containers of various shapes are interchangeable on said operating means, a pair of oppositely disposed pasting, labeling and pressing devices for labeling opposite sides of the container being advanced, one of said pair operating to label the container while quiescent and the other of said pair operating to label the opposite side of the container while in motion, and means for mutually adjusting said two pairs to accommodate the relative positions of operation whereby different size containers may be operated upon, in combination with means for operating said two pairs in relative timed relation with reference to said gripping devices.

12. A labeling machine comprising oppositely disposed gripping means intermittently gripping and advancing step by step a container in a labeling machine, a pair of pasting, labeling and pressing devices oppositely disposed and operating alternately to label said container on opposite sides thereof, one while said gripping means is quiescent with its gripped container, and the other operating while said container is being moved by said gripping means whereby at the end of the step by step movement both sides of the container are labeled.

PAUL R. POWELL.